Figure 1:
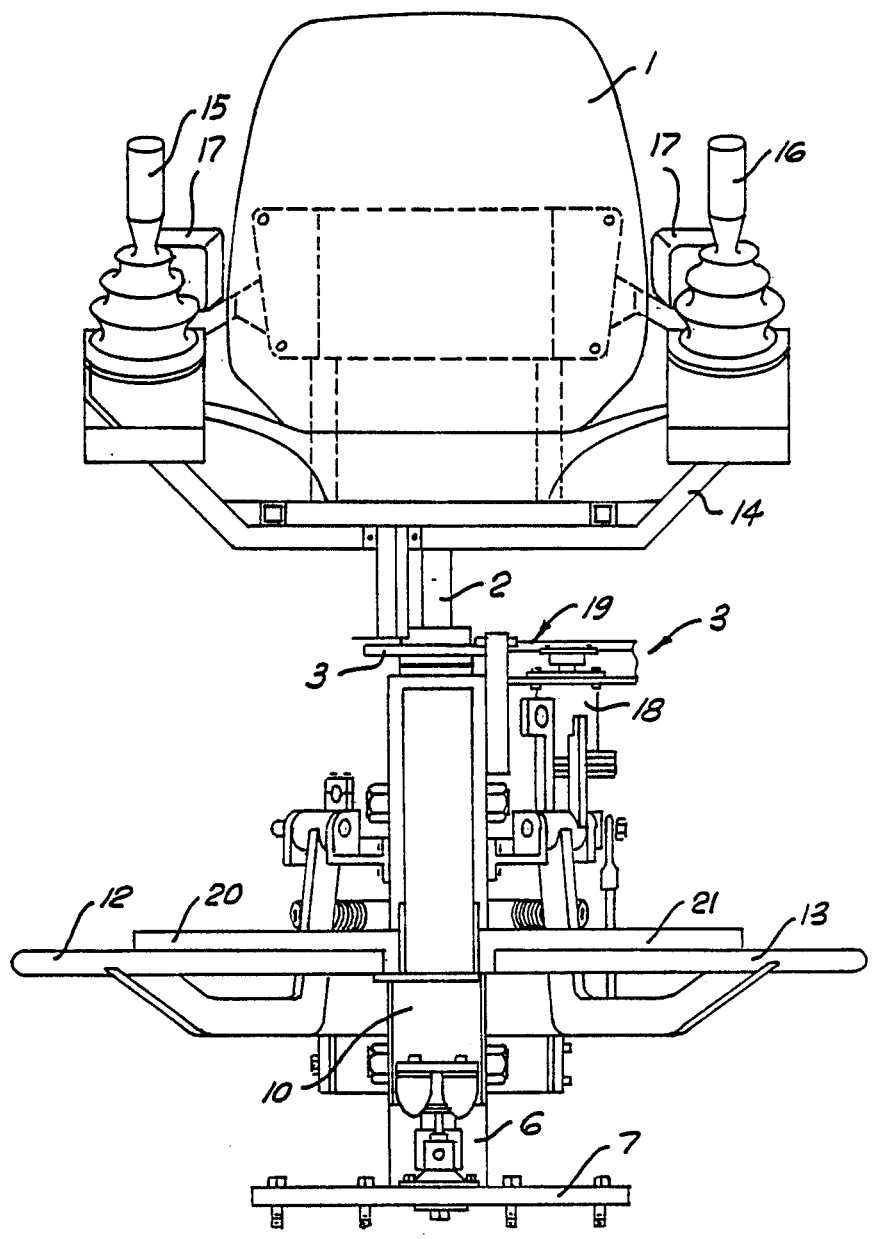

United States Patent [19]

Grigg

[11] Patent Number: 4,730,691
[45] Date of Patent: Mar. 15, 1988

[54] BI-DIRECTIONAL VEHICLE CONTROL STATION

[75] Inventor: Frank W. Grigg, Corinda, Australia

[73] Assignees: M.I.M. Holdings Limited; University of Queensland, both of Brisbane, Australia

[21] Appl. No.: 900,405

[22] Filed: Aug. 26, 1986

[30] Foreign Application Priority Data

Aug. 27, 1985 [AU] Australia ............................. PH02150

[51] Int. Cl.4 ........................ B60N 1/06; B62D 33/06
[52] U.S. Cl. .................................... 180/329; 180/326
[58] Field of Search .............. 180/315, 329, 317, 326, 180/330; 297/411; 248/631, 550

[56] References Cited

U.S. PATENT DOCUMENTS

| 3,195,913 | 7/1965 | Hallsworth | 180/329 |
|---|---|---|---|
| 3,774,711 | 11/1973 | Lacey | 180/329 |
| 3,938,770 | 2/1976 | Turner et al. | 248/631 |
| 4,057,122 | 11/1977 | Brownell et al. | 180/329 |
| 4,059,171 | 11/1977 | Pakosh | 180/329 |
| 4,278,144 | 7/1981 | Perin | 180/329 |
| 4,392,546 | 7/1983 | Brown et al. | 180/326 |
| 4,478,308 | 10/1984 | Klaasen | 180/326 |

Primary Examiner—Richard A. Bertsch
Attorney, Agent, or Firm—Leydig, Voit & Mayer

[57] ABSTRACT

A control station for a vehicle adapted to be driven alternately in forward and reverse directions by a seated driver. A swivel seat allows for horizontal rotation about an upright axis and is mounted to the vehicle on shock-absorbing suspension means. A foot rest is fixed relative to the swivel rotation of the seat, providing the driver with the capability of controlling the swivelling of the seat by foot pressure while the vehicle is being driven. Additional foot and hand controls are mounted to the control station such that they rise and fall with the seat of the control station.

5 Claims, 2 Drawing Figures

BI-DIRECTIONAL VEHICLE CONTROL STATION

This invention relates to a Load-Haul-Dump vehicle and more particularly to a control station for use in such vehicles.

Load-Haul-Dump (LHD) vehicles are specialized low profile, four-wheel drive, articulated front-end-loaders especially designed for underground mining operations.

In typical operation the LHD vehicle approaches and loads ("mucks") the ore in the as-blasted condition at a stope draw point. The vehicle then reverses to a driveway, changes direction and moves forward ("tramming") to an ore pass. As the ore pass is approached, a load carrying bucket is raised to facilitate dumping of the ore. After dumping at the ore pass the vehicle reverses to the draw point entrance, and then moves forward to muck at the stope draw point and repeat the cycle.

Because LHD vehicles are required to operate in narrow and/or low passages and in both directions it is usual for the drivers to be seated at one side facing sideways and midway between front and rear of the machine so that the driver has an equally clear view in both directions.

From this position the driver moves his head and shoulders outside of the line of the vehicle to obtain a clear view when mucking and maneouvering. The driver rotates his head and shoulders to maintain a clear view when changing direction. These movements present ergonomic problems.

The driver controls the vehicle by means of a steering wheel or hand controls to alter steering direction and hand control to reverse or go forward and foot controls to control acceleration and braking, the space provided for which is generally severely limited.

In addition the low natural pitch/bounce frequencies inherent in LHD vehicles make vibration isolation of the driver difficult and hinders uniform operation or graduated application of the foot pedals.

An object of the present invention is to provide a control station which in preferred embodiments avoids at least some of the above disadvantages.

According to one aspect, the invention consists in a control station for a vehicle adapted to be driven in a forward or in a reverse direction, said station including a driver's seat mounted for swivel rotation about an upright axis by means including a shock absorbing suspension, foot rests and foot controls mounted to rise and fall with said seat.

In preferred embodiments the upright axis of rotation of the seat extends through the centre of gravity of a seated driver and the station is also provided with hand controls.

In a much preferred embodiment the foot controls include accelerator and brake pedals and are mounted around the axis of rotation of the seat and are arcuately shaped, while the hand controls include steering and function joysticks mounted to the seat.

Figure 2:
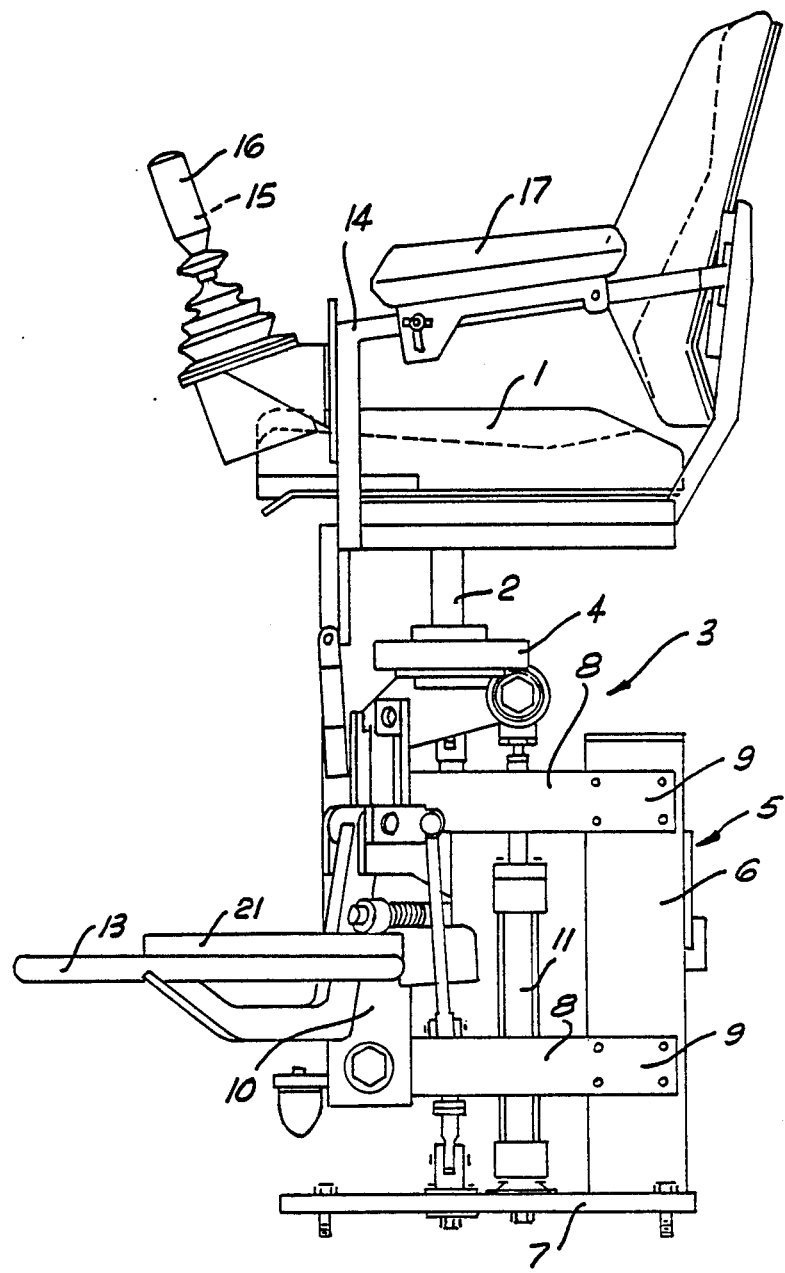

A preferred embodiment of the present invention will now be described by way of example only, with reference to the accompanying drawings in which:

FIG. 1 is a front elevation of a control station according to the present invention, and FIG. 2 is a side elevation of the control station shown in FIG. 1.

Referring to the drawings, the control station includes a driver's seat 1 which is mounted for shock absorption and for swivel rotation about an axis 2 by a mounting means 3. Mounting means 3 therefore includes a swivel arrangement 4 and a shock absorbing suspension 5. Axis 2 is disposed to extend through the centre of gravity of a seated driver. So positioned, during acceleration or deceleration of the vehicle, the seat and driver will not tend to rotate relative to the vehicle to upset the operation of the vehicle.

Swivel arrangement 4 is interposed between the seat 1 and shock absorbing suspension 5 and enables swivel rotation therebetween.

Suspension 5 includes a pillar 6 projecting upwardly from a mounting plate 7. Mounting plate 7 is adapted to be secured to the cabin floor of the vehicle. A pair of spaced apart wishbone elements 8 are pivotally mounted to pillar 6 to rotate relative thereto about axes 9. A connecting element 10 is pivotally mounted for rotation between the respective distal ends of wishbone elements 8 so that the connecting element 10 and the wishbone elements 8 are restrained to move in the manner of a pantograph. That is to say, element 10 is restrained to translational motion with its longitudinal axis extending vertically.

An hydraulic cylinder 11 extends between mounting plate 7 and element 10. The cylinder is connected to a hydraulic accumulator via a hydraulic hose and tube containing a restriction. The presence of a charge of nitrogen in the hydraulic accumulator in conjunction with the restriction element in the connection to the cylinder provides a damped resilience to the vertical motion of element 10, swivel arrangement 4 and seat 1 with respect to the vehicle. The volume of oil contained in the cylinder/hydraulic accumulator circuit can be varied by means of a hydraulic pump thereby providing a variation in the rest height of element 10 swivel 4 and seat 1 with respect of the vehicle. This feature enables operators of different heights to achieve the same line of sight relative to the vehicle.

Foot controls 12 and 13 are pivotally mounted to element 10 and therefore must rise and fall with seat 1.

Additionally, hand controls are provided mounted with frame 14 of seat 1 to rotate therewith. The hand controls comprise joysticks 15 and 16 disposed in front of and on either side of seat 1 so that they may be comfortably grasped by a driver whilst sitting in the seat and resting his arms on rests 17.

Arcuately-shaped foot pedals 12 and 13 constitute accelerator and brake controls whilst joysticks 15 and 16 constitute vehicle function and steering controls respectively.

During operation of the vehicle, the driver, sitting in seat 1 may steer the vehicle and control the vehicle's function with joysticks 15 and 16 whilst controlling the speed at which the vehicle is moving with foot pedals 12 and 13. Since the foot pedals are not free to rotate with the seat, the driver may swivel the seat relative to the vehicle so as to at least partially face the direction of motion by pushing sidewardly against the arcuately shaped foot rests 20 and 21. When the vehicle is traversing uneven ground, the driver can maintain good control of the speed of the vehicle as the brake and accelerator pedals rise and fall with the seat and therefore with the driver.

The station is provided with an hydraulic motor 18 which drives a screw via a chain and sprocket drive 19 to effect the selective height adjustment of the seat 1 relative to foot controls 12 and 13.

It will be appreciated that a control station having a steering wheel instead of joysticks will fall within the scope of the present invention.

It will further be appreciated that if a steering wheel is used, although it need not necessarily be mounted to rotate with the seat, it is desirable that it be mounted to rise and fall with the seat and the foot pedals during vehicle operation. Furthermore, any suitable suspension arrangement may be used.

I claim:

1. A control station for use by a driver in a vehicle adapted to be driven alternately in forward and reverse directions, said control station comprising:

a seat mounted for swivel rotation about an upright axis by means comprising a shock-absorbing suspension, said axis extending substantially through the center of gravity of the seated driver, said seat being free to swivel while the vehicle is in motion;

foot rest means fixed relative to the swivel rotation of the seat for facilitating controlled swivelling of the seat by the driver's foot pressure while the vehicle is being driven; and foot controls adjacent said foot rest means and extending around said axis such that they may be operated at all operational rotational positions of the seat, said foot controls and said foot rest means being mounted to rise and fall with the seat.

2. The control station of claim 1 wherein hand controls are carried by said station, said hand controls comprising steering and vehicle joysticks mounted on the seat.

3. The control station of claim 1 wherein said foot controls are mounted around said axis and comprise arcuately-shaped accelerator and brake pedals.

4. The control station of claim 1 wherein said suspension means comprises a hydraulic cylinder connected to an accumulator pressurized to variably control the dampened resilience of said suspension means when vertical movement of said seat causes hydraulic fluid to flow through a restricting orifice element in the connection to said cylinder.

5. The control station of claim 1 wherein steering means for steering said vehicle are mounted to rise and fall with said seat and said foot controls.

* * * * *